Nov. 4, 1924.
S. KOBZY
1,514,534
AUTOMOBILE SIGNAL
Original Filed Jan. 5, 1920  3 Sheets-Sheet 1
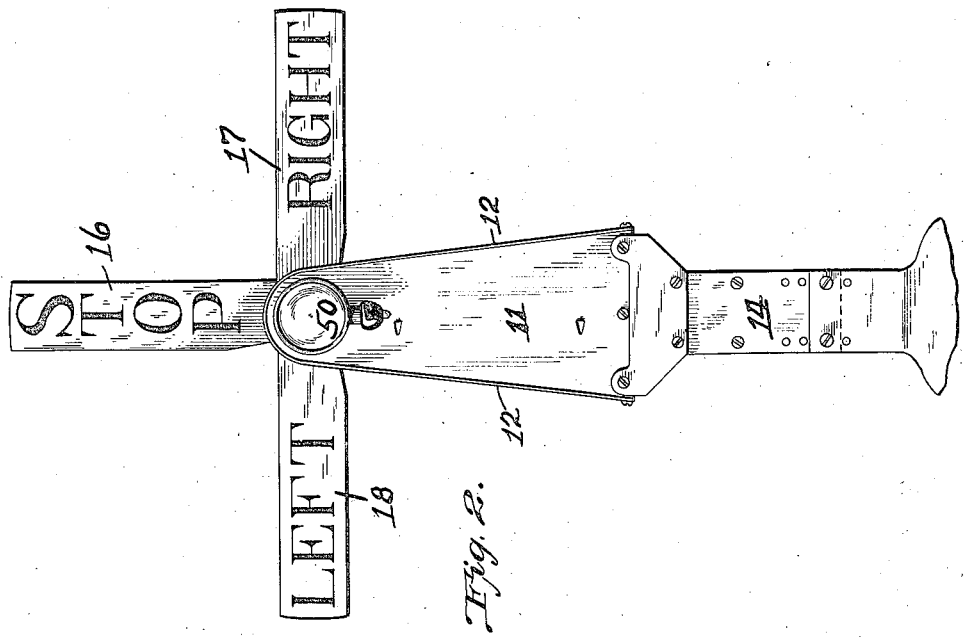
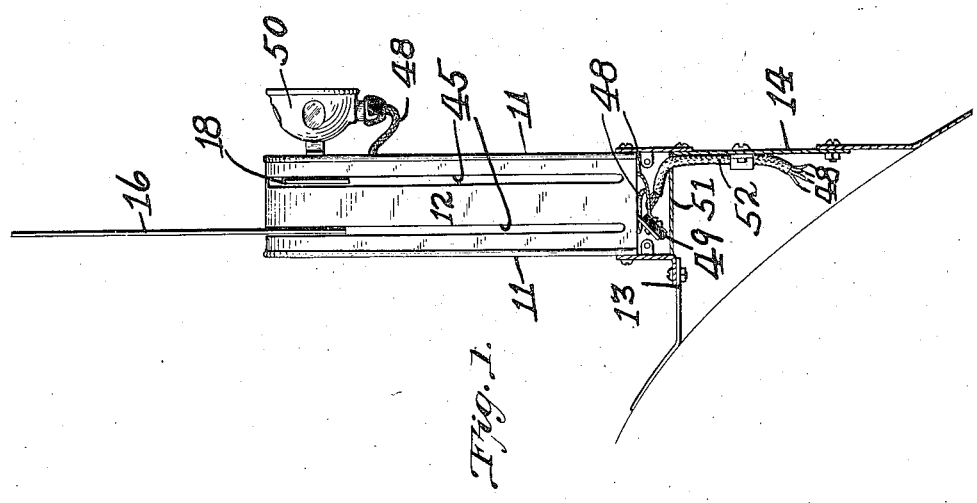

Nov. 4, 1924.
S. KOBZY
1,514,534
AUTOMOBILE SIGNAL
Original Filed Jan. 5, 1920    3 Sheets-Sheet 2
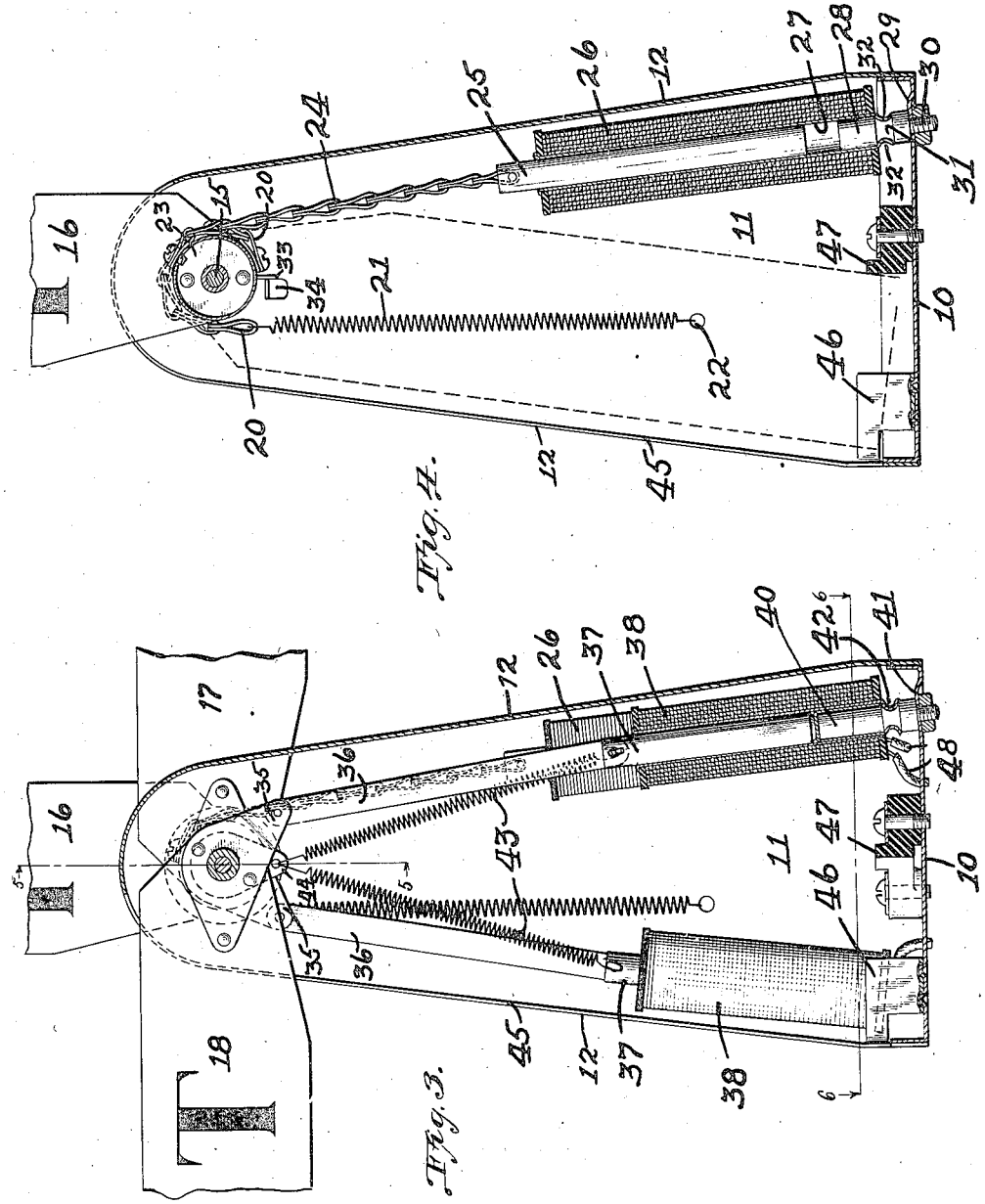
Witnesses:
Rose K. Vrib
B. J. Richards
Inventor:
Steven Kobzy
By Joshua H. Potts
Attorney

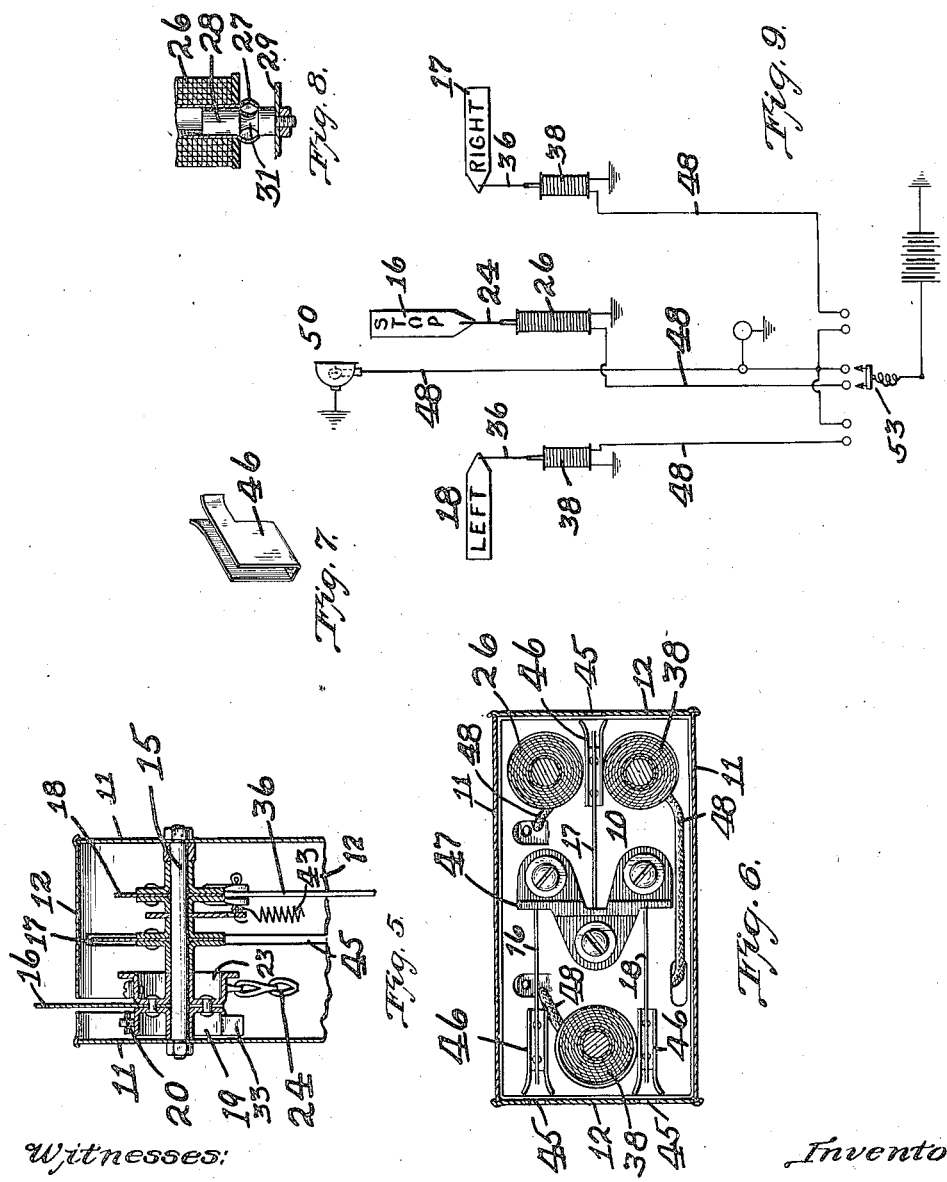

Patented Nov. 4, 1924.

1,514,534

UNITED STATES PATENT OFFICE.

STEVEN KOBZY, OF CHICAGO, ILLINOIS, ASSIGNOR TO CHICAGO DIE & SPECIALTY COMPANY, A CORPORATION OF ILLINOIS.

AUTOMOBILE SIGNAL.

Application filed January 5, 1920, Serial No. 349,428. Renewed August 25, 1924.

*To all whom it may concern:*

Be it known that I, STEVEN KOBZY, a former subject of the Emperor of Hungary, who have declared my intention of becoming a citizen of the United States, and a resident of the city of Chicago, county of Cook, and State of Illinois, have invented certain new and useful Improvements in Automobile Signals, of which the following is a specification.

My invention relates to improvements in automobile signals of the type arranged to be secured to the rear of the automobile and adapted to indicate to those to the rear thereof the operating intentions of the driver thereof, the object of the invention being to provide a simple and effective device of this character which is simple and efficient in use, and capable of economical manufacture.

Other objects will appear hereinafter.

The invention consists in the combinations and arrangements of parts hereinafter described and claimed.

The invention will be best understood by reference to the accompanying drawings forming a part of this specification, and in which—

Fig. 1, is a side view of an automobile signal embodying the invention,

Fig. 2, a rear view of the same,

Fig. 3, an enlarged rear view of the signal proper, shown partially in vertical section, Fig. 4, a view similar to Fig. 3 but with the section taken on a different vertical plane, Fig. 5, a section taken on line 5—5 of Fig. 3, Fig. 6, a section taken on line 6—6 of Fig. 3, Fig. 7, a perspective view of one of a plurality of guides employed in the construction, Fig. 8, a detail section illustrating a solenoid mounting employed in the construction, and Fig. 9, a diagrammatic view illustrating the electric circuits employed in the construction.

The preferred form of construction, as illustrated in the drawings, comprises a suitable casing, preferably made of sheet metal and having a base plate 10, end walls 11, and combined side and top walls 12, all secured to said base plate to form a casing, as indicated. The casing thus formed is provided with brackets 13 and 14 by means of which the same may be conveniently mounted on the rear of the mud-guard of an automobile, as indicated in Fig. 1. A pivot rod or bolt 15 is extended transversely through the upper end of said casing and three signal arms 16, 17 and 18 are mounted to swing freely thereon, the arm 16 being marked with the word "Stop," the arm 17 being marked with the word "Right" and the arm 18 being marked with the word "Left," as shown, to indicate the operating intentions of the driver of the automobile.

The signal arm 16 is provided on its forward side with a hub portion 19 in the form of a pulley or drum having a chain 20 secured thereto and partially wound thereon, the other end of said chain 20 being connected to a tension spring 21 anchored at 22 to one side of the casing, and whereby the tension of the spring 21 tends to hold the signal arm 16 normally in its inoperative position within said casing. At its rear side, signal arm 16 is provided with a hub in the form of a pulley or drum 23, having one end of a chain 24 secured thereto and partially wound thereon, the other end of said chain 24 being secured to the upper end of the core 25 of a solenoid 26 mounted in said casing in inclined position, as shown. The solenoid 26 is provided with a sheet metal tube or sleeve 27 forming the bore thereof, and an upstanding inclined stud 28 is fitted within said bore to hold said solenoid in proper relation with the drum hub 23. In order to properly position the stud 28, an inclined land 29 is struck up from the sheet metal base 10, in the proper position, and the lower end of the stud 28 provided with a stud bolt 30 passing through a perforation provided in said land and serving to secure said stud in upstanding position perpendicularly to the surface of the land 29, thus giving said stud the proper inclination. The stud 28 is provided with a securing groove 31 and the lower end of the sleeve 27 is projected somewhat beyond the bottom of the solenoid 26, and beads or indentations 32 are struck inwardly in the opposite sides of said extension to engage the groove 31 and thus securely lock the solenoid 26 in place, thus furnishing a simple and efficient mounting for the solenoid. A stop ear 33 is struck up from the periphery of the drum 23 and arranged to engage a stop ear 34 struck up from the adjacent end wall 11 of the casing, and whereby the operative movement of the arm 16 is stopped when said arm reaches vertical position.

Each of the signal arms 17 and 18 is provided with a rocker arm 35 connected by a rigid link 36 with the core 37 of a corresponding solenoid 38, said link 36 being pivotally connected at one end to the corresponding arm 35, and at its other end to the corresponding core 37. Each of the solenoids 38 is mounted on an inclined stud 40 secured to a land 41 in the casing bottom 10 and held in place by beads 42 struck into a groove in said stud, all substantially as solenoid 26 is mounted upon stud 28, with the exception that the studs 40 are extended within the corresponding solenoids sufficiently to act as stops for the ends of the cores 37 to limit the movements of the arms 17 and 18 at horizontal positions, as indicated. Springs 43 are connected with the upper ends of the cores 37 and with a collar plate 44 loosely secured on rod 15, and whereby the arms 17 and 18 are normally and yieldingly held in inoperative positions within the casing.

Suitable slots 45 are provided in the side walls and top 12 of the casing to permit of the free swing and operation of the signal arms 16, 17 and 18, and suitable guides 46 are mounted within the casing on the base 10 in registration with said slots to guide the movements of said signal arms within the casing and to insure free passage thereof through the slots. A rubber bumper 47 is secured centrally to base 10 in position to contact with the inner edges of the signal arms 16, 17 and 18 and cushion the downward and inoperative movements thereof to lessen the jars and shocks.

Suitable electric wires 48 are connected with the casing base 10, a suitable block 49 being provided thereon and equipped with suitable binding posts for the purpose. A suitable signal light 50 is also positioned at the rear upper side of the signal casing and electric wires 48 are led to said signal light and to each of the solenoids 26—38, as indicated. A suitable guard casing 51 is secured to the under side of base plate 10 to protect the wire connections, and the wires 48 are led therethrough in a suitable cable or cord 52, as shown. The various wires 48 are led to a suitable switch 53 mounted on the steering post of the automobile and illustrated diagrammatically with the circuits in Fig. 9. The specific form of switch employed constitutes no part of the present invention, the same being fully illustrated, described and claimed in my application filed of even date herewith, and requires no further description or illustration here, except to say that it is adapted and arranged to close the circuits through the various solenoids and light 50 when and as desired, to operate said light and the different signal arms to indicate the intentions of the operator of the automobile.

The signal device thus produced is simple and effective in use, small in size and capable of economical manufacture. The specific form and arrangement of parts employed constitutes a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A casing for automobile signals provided with a sheet metal base having inclined lands formed therein; and upstanding inclined studs arranged on said lands perpendicularly thereto and secured in position by securing means passing through said lands, substantially as described.

2. A casing for automobile signals provided with a sheet metal base having inclined lands formed therein, there being central perforations in said lands; and upstanding inclined studs provided with stud bolts passing through said perforations and nuts binding said studs to said lands, substantially as described.

In testimony whereof I have signed my name to this specification in the presence of two subscribing witnesses.

STEVEN KOBZY.

Witnesses:
JOSHUA R. H. POTTS,
ROSE K. TRIB.